Sept. 27, 1955  A. BARTLETT  2,718,718
ADJUSTABLE SCOOP ASSEMBLY FOR TRACTORS
Filed Feb. 3, 1953  2 Sheets-Sheet 1
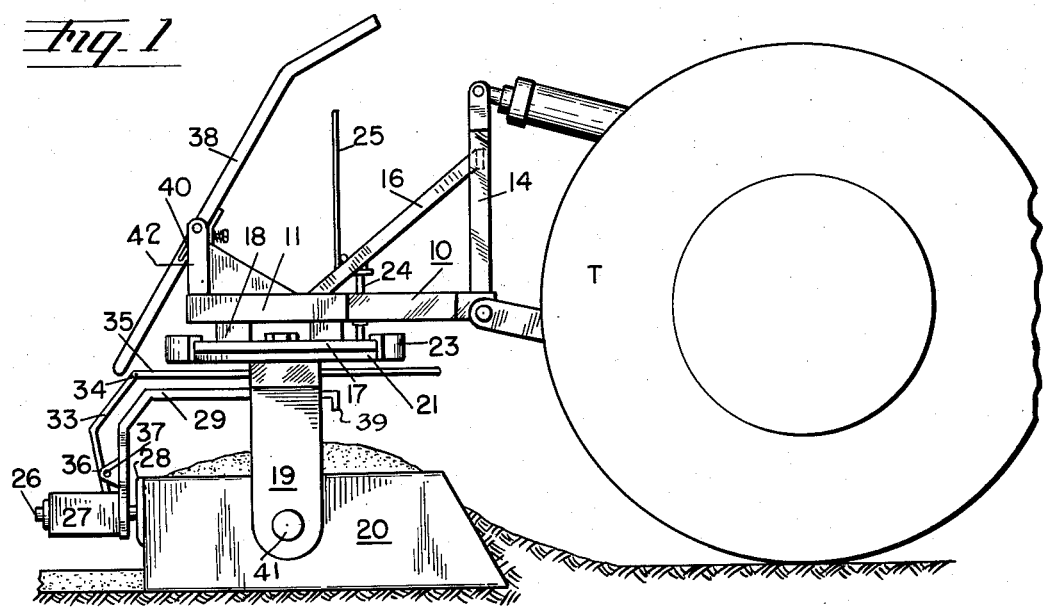
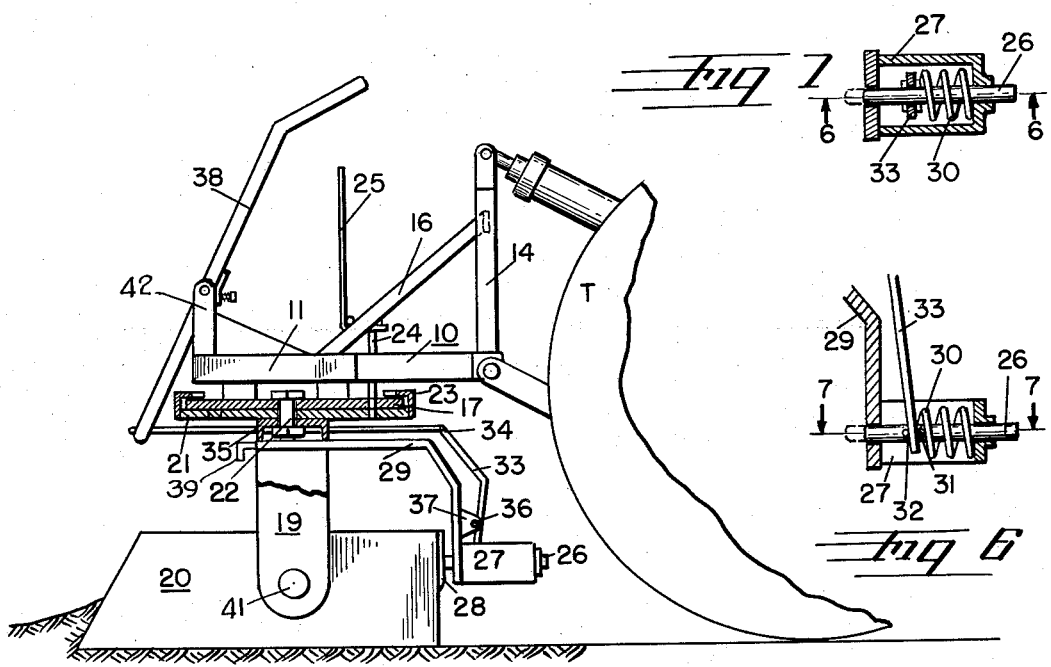
INVENTOR.
ARMOR BARTLETT
BY
ATTORNEY Sept. 27, 1955    A. BARTLETT    2,718,718
ADJUSTABLE SCOOP ASSEMBLY FOR TRACTORS
Filed Feb. 3, 1953    2 Sheets-Sheet 2
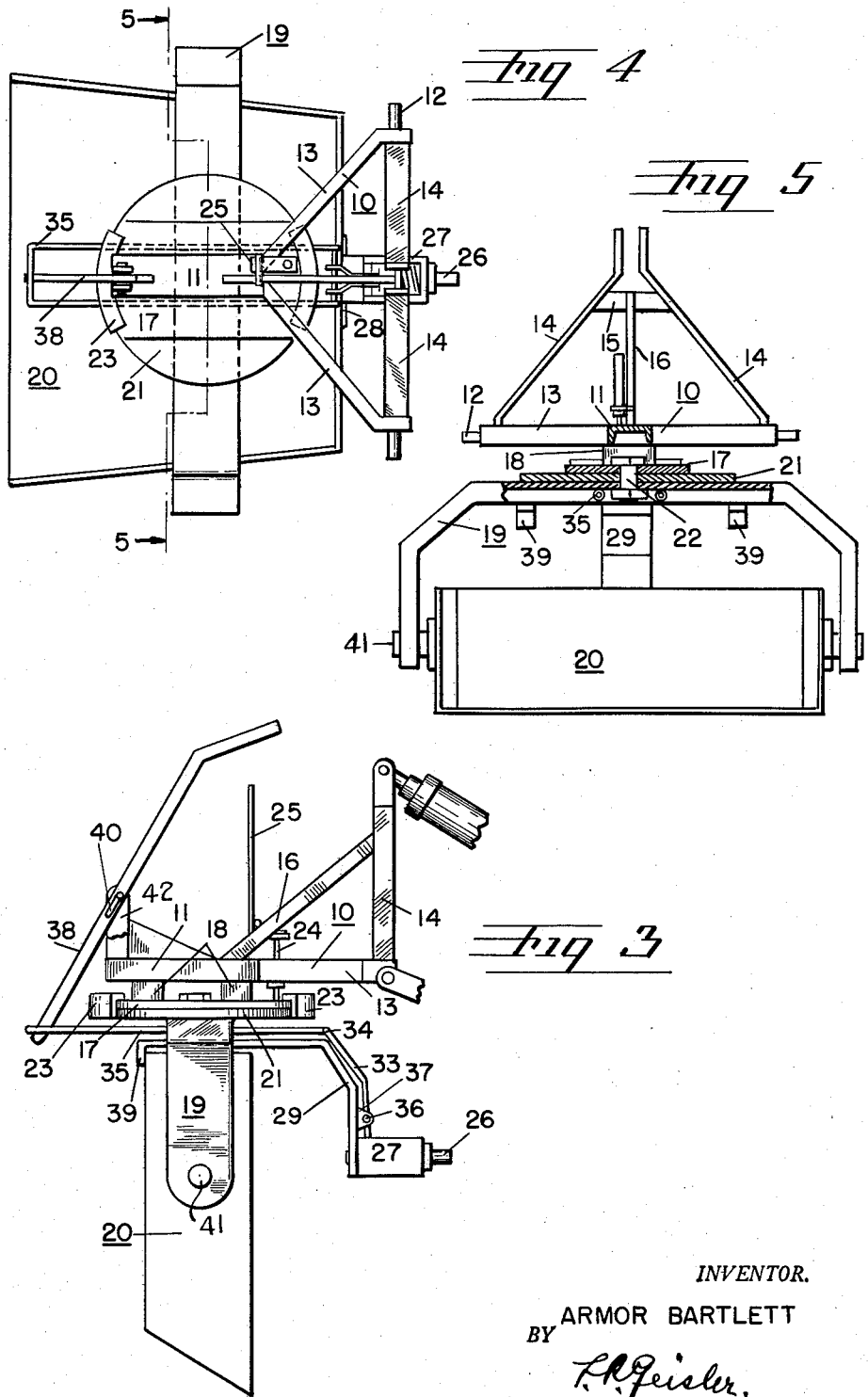
INVENTOR.
ARMOR BARTLETT
BY
F. R. Geisler,
ATTORNEY United States Patent Office 2,718,718
Patented Sept. 27, 1955

2,718,718
ADJUSTABLE SCOOP ASSEMBLY FOR TRACTORS
Armor Bartlett, Vancouver, Wash.
Application February 3, 1953, Serial No. 334,945
2 Claims. (Cl. 37—126)

This invention relates to ground-working attachments for tractors, and, in particular, to scoop attachments adaptable for moving dirt, gravel, etc., in grading, leveling, filling, and in similar ground-working operations.

An object of this invention is to provide an improved simplified and adjustable scoop assembly adapted for being mounted on a tractor by means of the customary three-point connection with the tractor, thus enabling the scoop assembly to be raised or lowered from the tractor.

Another object of this invention is to provide an adjustable scoop assembly of the type indicated in which the scoop or shovel itself can easily be reversed or rotated through 180° so as to enable the scoop to be operated either by being pulled on the ground by forward movement of the tractor or, with equal facility, by being pushed on the ground by the backing of the tractor, and thus making the use of the scoop very flexible and practical.

A further object of the invention is to provide means for manually dumping the filled scoop when the scoop has been raised from the ground and to have such means capable of manual operation regardless of the rotated position of the scoop.

These objects and incidental advantages I attain by making my improved scoop assembly as hereinafter described and as shown in the accompanying drawings, and by mounting and employing the same as hereinafter explained.

In the accompanying drawings, to which reference is made in the following description and explanation:

Fig. 1 is a side elevation of my scoop assembly illustrating the same mounted at the rear of a tractor, with the scoop shown in lowered ground-engaging position and in the act of being pulled by the forward travel of the tractor;

Fig. 2 is a corresponding side elevation showing the scoop rotated through 180° and in lowered ground-engaging position and in the act of being pushed on the ground by the rearward travel of the tractor;

Fig. 3 is a side elevation showing the scoop assembly of Fig. 2 in raised position and with the scoop itself released into dumping or discharging position, and also into scraping or leveling position;

Fig. 4 is a plan view of the scoop assembly of Fig. 2 but showing the same entirely separated from the tractor;

Fig. 5 is a sectional elevation taken on line 5—5 of Fig. 4;

Fig. 6 is an enlarged fragmentary sectional elevation of the scoop-latching means taken on line 6—6 of Fig. 7; and Fig. 7 is a corresponding plan section of the scoop latching means taken on line 7—7 of Fig. 6.

An upper substantially rigid frame structure, designated as a whole by the reference character 10 in the drawings, is so arranged and constructed as to be attached to the tractor T by the usual three-point connection, thus enabling the frame structure to be carried on the tractor and raised or lowered by the usual control mechanism of the tractor.

This upper frame structure includes a main central longitudinally-extending bar 11, a front cross bar 12, the reduced ends of which are connected to the side lift arms of the tractor, a pair of bottom side braces 13, a pair of upwardly-extending and converging bracket arms 14, connected near the top by a web 15 (Fig. 5), and a tie bar 16 extending from the web 15 to the main central bar 11.

A base plate 17 is rigidly secured to the central bar 11 through a pair of interposed rigidly-mounted blocks 18. This base plate 17 preferably is in the form of a circular plate from which opposite equal segments have been removed so as to leave a pair of opposite parallel straight sides.

A scoop assembly, mounted below the upper frame structure 10, consists of a scoop-mounting frame 19 and a scoop 20 hingedly mounted between the opposite downwardly-extending arms of the frame 19 on the pivot pins 41. The hinge mounting is so positioned on the scoop that the scoop, when free to do so, will tilt downwardly into the discharging position illustrated in Fig. 3. The scoop is normally held against tilting and held in substantial load-carrying horizontal position by locking means which will be later described.

A circular plate 21 is secured in central position on the top of a scoop-mounting frame 19. The radius of this plate 21 corresponds to the radius of the arcuate ends of the base plate 17 of the upper frame structure. A center bearing bolt 22 (Figs. 2 and 5) extends through registering apertures in the plates 21 and 17. A pair of curved retainers 23, having inwardly-extending top flanges, are welded to the periphery of the plate 21 and are diametrically opposite each other and so arranged as to extend above and over the arcuate ends of the plate 17 and thus hold the plate 21, and with it the entire scoop assembly, firmly supported by the plate 17 but permitting rotation of the scoop assembly with respect to the plate 17 and upper frame structure 10.

A locking pin 24 is slidable up and down in a pair of vertically aligned holes in the central bar 11 and base plate 17. A bell crank lever 25 is connected with the top of the locking pin 24 as an aid in lifting the locking pin. The plate 21 is provided with a pair of holes exactly 180° apart which are so located that one hole will be engaged by the locking pin 24 when the scoop assembly is in the position illustrated in Fig. 1 and the other hole will be engaged by the locking pin when the scoop assembly is in the position of Fig. 2. Thus the scoop assembly can be locked in either of these two operating positions with respect to the upper frame structure 10, depending upon whether the scoop 20 is to be operated by a forward pull of the tractor T, as in Fig. 1, or by rearward push of the tractor T, as in Fig. 2.

In order to hold the scoop 20 against tipping downwardly a spring-actuated latching bar 26 is slidably mounted in a housing 27 and is adapted to engage a recess in a locking plate 28 attached on the back wall of the scoop 20. The housing 27 is supported on a bracket arm 29, the upper portion of which bracket arm is rigidly secured on the scoop-mounting frame 19. A spring 30 (Figs. 6 and 7) on the latching bar 26 within the housing 27 is held under compression between the outer end wall of the housing 27 and a pin 31 on the latching bar and normally holds the latching bar in locking engagement with the scoop. A second pin 32 prevents the latching bar from being thrust forward too far by the spring 30 when the scoop is in the unlatched position of Fig. 3.

A control lever 33 for the latching bar 26 has an enlarged aperture through which the latching bar extends.

The control lever 33 passes through the open top of the housing 27 and is secured on a pin 36 which is rockably supported in a pair of ears 37 mounted on the bracket arm 29. The top end of the control lever 33 is pivotally connected to a slide element 35 comprising a substantially rectangular frame which is slidably mounted in the top of the scoop-mounting frame 19. The element 35 and the connected lever 33 constitute the latch releasing means for the scoop. Thus it will be apparent that a thrust of this slide element 35 from left to right (when the scoop assembly is in the position of Fig. 1) and a thrust from right to left (when the scoop assembly is in the position of Fig. 2), as viewed in these figures, will cause the latching bar to be moved into unlatched position.

Manually operable means for the latch releasing means consists of a slide-actuating arm 38 which is pivotally mounted on a pin supported in a bracket 42 carried on the central bar 11 of the upper frame structure. The arm 38 has a slot 40 through which the pivot pin extends, thus permitting slight longitudinal movement of the arm 38 as well as a rocking of the arm.

When the scoop assembly is in the position illustrated in Fig. 1 and has been raised by the tractor, it will be apparent that a slight rotation of the arm 38 counterclockwise, will cause the lower end of the arm 38 to bear against the outside of the adjacent end of the slide 35 and thus move the slide 35 and with it the latch control lever 33 and unlatch the scoop so as to permit the scoop to tip in the scoop-mounting frame 19. However, when the position of the scoop assembly is reversed, and the assembly has been rotated through 180°, the arm 38 can be slid upwardly slightly until the bottom end of the arm can be inserted inside the adjacent end of the slide 35, as illustrated in Fig. 2. Then with the bottom end of the arm 38 in contact with the inside of the end of the slide 35 in this manner it will be apparent that a slight swing of the arm 38 in clockwise direction, as viewed in Figs. 2 and 3, when the scoop assembly has been raised by the tractor, will result in the unlatching of the scoop 20.

Thus, regardless of whether the scoop assembly is in one of the operating positions or in the reverse operating position, the arm 38 can be operated to unlock the raised scoop so as to permit the scoop to swing downwardly into discharging position. In one case this is accomplished by a slight forward pull (Figure 2) on the top end of the arm 38 and in the other case this is accomplished by a slight rearward thrust (Figure 1) on the top end of the arm 38. Only a slight adjustment of the arm position is required to enable this arm 38 to function in either event. The top end of the arm 38, by being extended forwardly, can be located within convenient reach of the operator of the tractor.

When the scoop or bucket 20 is unlatched and permitted to swing down into discharging position the scoop can also be used for leveling the dumped material or as a ground scraper. A pair of abutments 39 (Figs. 3 and 5) prevent the scoop swinging beyond the vertical position as illustrated in Fig. 3. Thus, with the scoop and scoop assembly positioned as in Fig. 3, it is apparent that such leveling or scraping can be accomplished by backing the tractor with the height of the assembly properly adjusted.

The adjustable scoop assembly consequently not only can be made to function in the ways described either by being pulled forwardly or by being pushed rearwardly by the tractor, but, in either case, the unlatching of the raised scoop, permitting the scoop to swing down into discharging position (and also into ground leveling or scraping position) is accomplished very easily under the control of the operator in the simple manner described.

I claim:

1. In an adjustable scoop assembly of the character described, an upper frame structure, means connected to said upper frame structure and connected to a tractor for mounting said frame structure at the rear of a tractor and for raising or lowering said frame structure from said tractor, a scoop-mounting frame rotatably supported from said upper frame structure and capable of rotation of at least 180° with respect to said upper frame structure, a ground-operating scoop mounted in said scoop-mounting frame, means on said upper frame structure for locking said scoop-mounting frame against rotation when said scoop is arranged for operation with the forward travel of said tractor and similarly for locking said scoop-mounting frame when said scoop-mounting frame and said scoop are reversed and arranged for operation with the rearward travel of said tractor, a hinge mounting for said scoop in said scoop-mounting frame enabling said scoop to swing downwardly from substantially horizontal load-carrying position to substantially vertical position, a latch on said scoop-mounting frame normally holding said scoop against swinging downwardly from load-carrying position, latch releasing means on said scoop-mounting frame connected with said latch, and manually-operable means on said upper frame structure cooperating with said latch releasing means when said scoop-mounting frame and said scoop are arranged for operation with said forward travel of said tractor and also when reversely arranged for operation with said rearward travel of said tractor.

2. An adjustable scoop assembly for tractors including an upper frame structure, means connected to said upper frame structure and connected to a tractor for mounting said frame structure at the rear of a tractor and for raising or lowering said frame structure from said tractor, a scoop-mounting frame rotatably supported from said upper frame structure and capable of rotation of at least 180° with respect to said upper frame structure, a ground-operating scoop mounted in said scoop-mounting frame, means on said upper frame structure for locking said scoop-mounting frame against rotation when said scoop is arranged for operation with the forward travel of said tractor and similarly for locking said scoop-mounting frame when said scoop-mounting frame and said scoop are reversed and arranged for operation with the rearward travel of said tractor, a hinge mounting for said scoop in said scoop-mounting frame enabling said scoop to swing downwardly from substantially horizontal load-carrying position to substantially vertical position, latching means on said scoop-mounting frame normally holding said scoop against swinging downwardly from load-carrying position, a latch releasing member on said scoop-mounting frame connected with said latching means, and a manually-operable arm on said upper frame structure engageable with said latch releasing member when said scoop-mounting frame and said scoop are arranged for operation with said forward travel of said tractor and also when reversely arranged for operation with said rearward travel of said tractor.

References Cited in the file of this patent

UNITED STATES PATENTS

| | | |
|---|---|---|
| 2,350,327 | Ender | June 6, 1944 |
| 2,465,831 | Arps | Mar. 29, 1949 |
| 2,496,874 | Holopainen | Feb. 7, 1950 |
| 2,506,759 | Wommer | May 9, 1950 |
| 2,560,711 | Arps | July 17, 1951 |
| 2,566,547 | Bartlett | Sept. 4, 1951 |